United States Patent [19]

Chadwick et al.

[11] Patent Number: 5,364,570
[45] Date of Patent: Nov. 15, 1994

[54] CERAMIC MATERIAL

[75] Inventors: Robert Chadwick, Stoke-on-Trent; Carl Siviter, Halesowen; Anthony D. Farmer, Birmingham, all of England

[73] Assignee: Foseco International Limited, Birmingham, England

[21] Appl. No.: 973,749

[22] Filed: Nov. 9, 1992

[30] Foreign Application Priority Data

Nov. 16, 1991 [GB] United Kingdom ............ 9124403.8

[51] Int. Cl.$^5$ ............................................. C04B 38/08
[52] U.S. Cl. ...................................... 264/28; 264/43; 264/56
[58] Field of Search ................. 264/28, 56, 43; 501/80

[56] References Cited

U.S. PATENT DOCUMENTS

| | | | |
|---|---|---|---|
| 2,869,215 | 1/1959 | Smith | 25/156 |
| 2,893,102 | 7/1959 | Maxwell et al. | 25/156 |
| 2,944,316 | 7/1960 | Maxwell et al. | 25/156 |
| 3,177,161 | 4/1965 | Smith-Johannsen | 252/502 |
| 3,222,435 | 12/1965 | Mellen, Jr. et al. | 264/28 |
| 3,269,850 | 8/1966 | Miller | 501/80 |
| 3,353,975 | 11/1967 | Shannon | 501/80 |
| 3,512,571 | 5/1970 | Phelps | 164/37 |
| 3,816,572 | 6/1974 | Roelofs | 264/28 |
| 3,885,005 | 5/1975 | Downing et al. | 264/28 |
| 4,246,209 | 1/1981 | Smith-Johannsen | 264/28 |
| 4,428,895 | 1/1984 | Blasch et al. | 264/28 |
| 4,526,734 | 7/1985 | Enomoto | 264/13 |
| 4,552,800 | 11/1985 | Blasch et al. | 428/212 |
| 4,569,920 | 2/1986 | Smith-Johannsen | 501/1 |
| 4,678,758 | 7/1987 | Kamfer | 501/80 |
| 4,965,230 | 10/1990 | Nakajima | 501/80 |
| 5,014,763 | 5/1991 | Frank | 164/15 |
| 5,047,181 | 9/1991 | Occhionero | 264/28 |

FOREIGN PATENT DOCUMENTS

| | | |
|---|---|---|
| 966275 | 4/1975 | Canada . |
| 016971 | 2/1980 | European Pat. Off. . |
| 0086500 | 8/1983 | European Pat. Off. . |
| 0371895 | 6/1990 | European Pat. Off. . |
| 59-121146 | 7/1984 | Japan . |
| 3111510 | 5/1991 | Japan . |
| 1375489 | 11/1974 | United Kingdom . |
| 1405759 | 9/1975 | United Kingdom . |
| 1569559 | 6/1980 | United Kingdom . |
| WO89/04735 | 6/1989 | WIPO . |
| WO92/05022 | 4/1992 | WIPO . |

OTHER PUBLICATIONS

Sargeant, "Holosphere—A Novel Ceramic Material"; Keith Ceramic Materials Ltd., Belvedere, Kent; pp. 132–135.

Green, "Fabrication and Mechanical Properties of Lightweight Ceramics Produced by . . . ", J. Am. Ceram. Soc. 68[7] 403–409 (1985).

*Primary Examiner*—James Derrington
*Attorney, Agent, or Firm*—Nixon & Vanderhye

[57] ABSTRACT

A lightweight ceramic material is provided, useful for example as thermal insulation, kiln furniture or for metallurgical applications.

Accordingly, a lightweight fired ceramic material comprises a set porous material in the form of a freeze-gelled ceramic sol composition containing hollow microspheres bonded together in a ceramic matrix.

A method of making a lightweight fired ceramic shaped product is also provided in which a freeze-gellable ceramic sol composition is formed containing hollow microspheres, the composition is placed in a tool (21) of high thermal conductivity, the tool is cooled to irreversibly gel the sol composition, the monolith so formed is demoulded and allowed to thaw and is then fired to form a product comprising the microspheres bonded in a ceramic matrix.

11 Claims, 3 Drawing Sheets

CERAMIC MATERIAL

This invention relates to ceramic material and to a method of making a ceramic material useful, for example, as thermal insulation material, as kiln furniture or in metallurgical applications.

Ceramic materials are known made from ceramic inorganic sol compositions that can be gelled by various means so that the gelling is irreversible. Such means include freeze-gelling, change of PH, dewatering and subjection to microwaves.

We have now found that by selection of a specific gelling technique together with the incorporation of hollow microspheres in a suitable sol composition, novel and advantageous fired products can be obtained.

Thus, the invention provides in one aspect a lightweight fired ceramic material comprising a set porous material in the form of a freeze-gelled ceramic sol composition containing hollow microspheres bonded together in a ceramic matrix. The ceramic matrix preferably contains mullite which is formed in-situ. The mullite may be the preponderant constituent of the matrix depending on the starting materials and processing conditions. The hollow micro-spheres are preferably alumina microspheres although silica or mullite or other similar materials may be used if desired.

In another aspect the invention provides a method of forming a lightweight fired shaped ceramic product in which a freeze-gellable ceramic sol composition is formed containing hollow microspheres, the composition is placed in a tool of high thermal conductivity having the desired shape, the tool is cooled at a rate sufficient to irreversibly gel the sol composition, the monolith so formed is demoulded and allowed to thaw and is fired to form a product comprising the microspheres bonded in a ceramic matrix.

The method of manufacture employed results in a novel product in which fine particles in the sol composition form a smooth surface layer over the matrix of bonded microspheres.

The tool is preferably of metal. Where intricate shapes are required it may be formed by spraying, e.g. flame spraying, of the metal onto a replica of the desired product shape. The replica may be made of any suitable material, e.g. metal, wood and Plaster of Paris. Simple or intricate shapes can, of course, be formed as the desired replica by this means and these shapes are then accurately reproduced in metal by the spraying process. However, where relatively simple shapes are required, it may be preferable to machine the tool.

The tool may conveniently have a thickness of from, e.g. 0.5 to 4 mm. Clearly the thickness and the type of material used will affect the heat transfer from the ceramic sol composition through the tool to the cooling liquid but the average skilled man of the art will readily be able to determine the optimum requirements for his particular circumstances and formulations.

Where a sprayed tool is used, sprayed metal is preferably an alloy of tin and zinc but other metals, e.g. zinc, aluminium copper or brass may be used, if desired. Electric arc flame spraying is the preferred spraying technique. Electric arc spraying is cooler than the alternative of oxy-acetylene spraying and so there is less chance of the metal deposition damaging the replica of e.g. Plaster of Paris.

The freeze-gelled product is thawed after removal from the tool and the water-content may then be driven off, e.g. by drying in a conventional oven or by microwave heating. The thawing and drying stages may be combined, if desired. Finally, firing at elevated temperature sufficient to consolidate the product, e.g. from 900° C. to 1700° C., is carried out.

The ceramic products produced by this route have excellent reproducibility and uniformity of structure with substantially regular distribution of the hollow micro-spheres throughout the ceramic matrix. The micro-spheres can be held distributed throughout the sol during the manufacturing process until gelling of the composition without any significant settling out.

Although any ceramic sol composition may be used that can be irreversibly-gelled by freezing, the sol used is preferably a silica sol. The sol will have suitable filler materials added to it to improve the strength of the product and to ensure adequate mullite formation as required.

The orientation of fine particles to the surface of the product during its formation results in a number of important advantages. The smooth surface that results has a lower coefficient of friction than a rougher surface. This is advantageous, for example, where the product is used as kiln furniture which supports china products during the latters' firing cycle. Any shrinkage of the china during its firing is less likely to cause sticking or 'plucking' problems as it moves across the surface of its furniture support.

The fine surface, which may be a few microns thick and normally comprises mullite or alumina rich mullite, also provides greater chemical stability owing to its lower surface area in comparison with traditional materials in this field. This is a useful advantage for kiln furniture but may be even more important on applications such as kiln linings where the atmosphere is chemically aggressive.

The finer surface, of course, is more aesthetically pleasing and may also improve the physical strength of the product.

In order to achieve a required degree of mullite formation, it is preferred that a silica sol binder should be used with a sufficiently reactive alumina filler. In essence, the finer the particle size and the greater the surface area of the filler, e.g. the alumina, the more reactive it will be and the greater the amount of mullite formation under similar firing conditions. The alumina may, therefore, be of colloidal particle size, say up to 1 micron but preferably from 1 to 250 nanometers, especially from 20 to 200 nanometers. It may be in sol form or particulate form. The particulate form may be amorphous or crystalline provided that it is of sufficiently small size to be adequately reactive. Mixtures of the various forms may also be used.

The particle size of the silica in the silica sol composition may also be up to 1 micron in size but preferably from 1 to 150 nanometers, especially from 7 to 30 nanometers.

Micronised mullite may advantageously be added to the sol composition as it may act as a seed for further mullite formation.

The hollow microspheres may be of any suitable size, e.g. from a few microns in diameter up to 5 mm in diameter. A mixture of smaller and larger spheres may be used if desired, e.g. a batch of spheres graded from 0.5 to 1 mm diameter could be used with a second batch of spheres of sub 0.5 mm diameter. Variations of the sizes and amounts used can be utilised to give a range of densities and other properties, e.g. thermal shock resistance, thermal conductivity and permeability, to the finished product. A wide range of proportions of microspheres may be incorporated in the sol composition, e.g. from 10% to 80% by weight. Use of spheres of different sizes enables packing densities to be optimised.

Typical sol compositions may contain from 5 to 50% by weight of silica, say. The sols may be stabilised by means of sodium or ammonium ions, for example.

Ranges of compositions particularly suitable for varying temperature usage of the end products are as follows.

|  | % by weight |
| --- | --- |
| (For use up to at least 1600° C.) | |
| 40 wt % ammonia-stabilised silica sol | 10–50 |
| alumina hollowspheres, 0.5–1.0 mm size | 1–50 |
| alumina hollowspheres, 0–0.5 mm size | 1–50 |
| alumina, finer than 0.25 mm | 1–30 |
| calcined microfine alumina | 5–25 |
| organic suspending agent | 0.1–2 |
| (For use up to 1350° C.) | |
| 40 wt % ammonia-stabilised silica sol | 10–50 |
| 25 wt % alkali alumina dispersion | 2–25 |
| alumina hollowspheres 0.5–1.0 mm size | 1–50 |
| alumina hollowspheres 0–0.5 mm size | 1–50 |
| amorphous alumina (high surface area) | 5–40 |
| alumina (finer than 0.25 mm) | 1–25 |
| fused mullite, finer than 0.08 mm | 0.1–5 |

Two specific Examples of formulations for use in the invention to give products for use at the above-mentioned higher and lower temperatures are:

EXAMPLE 1

A composition suitable for end use at temperatures up to 1600° C. or higher was made as follows.

|  | Parts by weight |
| --- | --- |
| 40 wt % ammonia stabilised silica sol | 29 |
| alumina hollowspheres, 0.5 to 1 mm size | 26 |
| alumina hollowspheres, 0 to 0.5 mm size | 13 |
| alumina, finer than 0.25 mm | 18 |
| calcined microfine alumina | 13 |
| organic suspending agent | 1 |

EXAMPLE 2

A composition suitable for end use at temperatures up to 1350° C. was made up as follows:

|  | Parts by weight |
| --- | --- |
| 40 wt % ammonia-stabilised silica sol | 26 |
| 25 wt % alkali alumina dispersion | 10 |
| alumina hollowspheres, 0.5 to 1 mm size | 29 |
| alumina hollowspheres, 0 to 0.5 mm size | 10 |
| amorphous alumina (high surface area) | 19 |
| alumina, finer than 0.25 mm | 5 |
| fused mullite, finer than 0.08 mm | 1 |

Embodiments of the invention will now be described by way of example only with reference to the accompanying drawings in which:

BRIEF DESCRIPTION OF THE DRAWINGS

In FIGS. 1 and 2 is shown a ceramic tray 10 made according to the invention as described in detail below. The tray is of rectangular configuration and has a peripheral uncavitied border 11 around each of its four sides. The central region 12 defined inside border 11 is filled with cavities 13 which are to receive unfired ceramic bodies for spark plugs.

Figure 1:
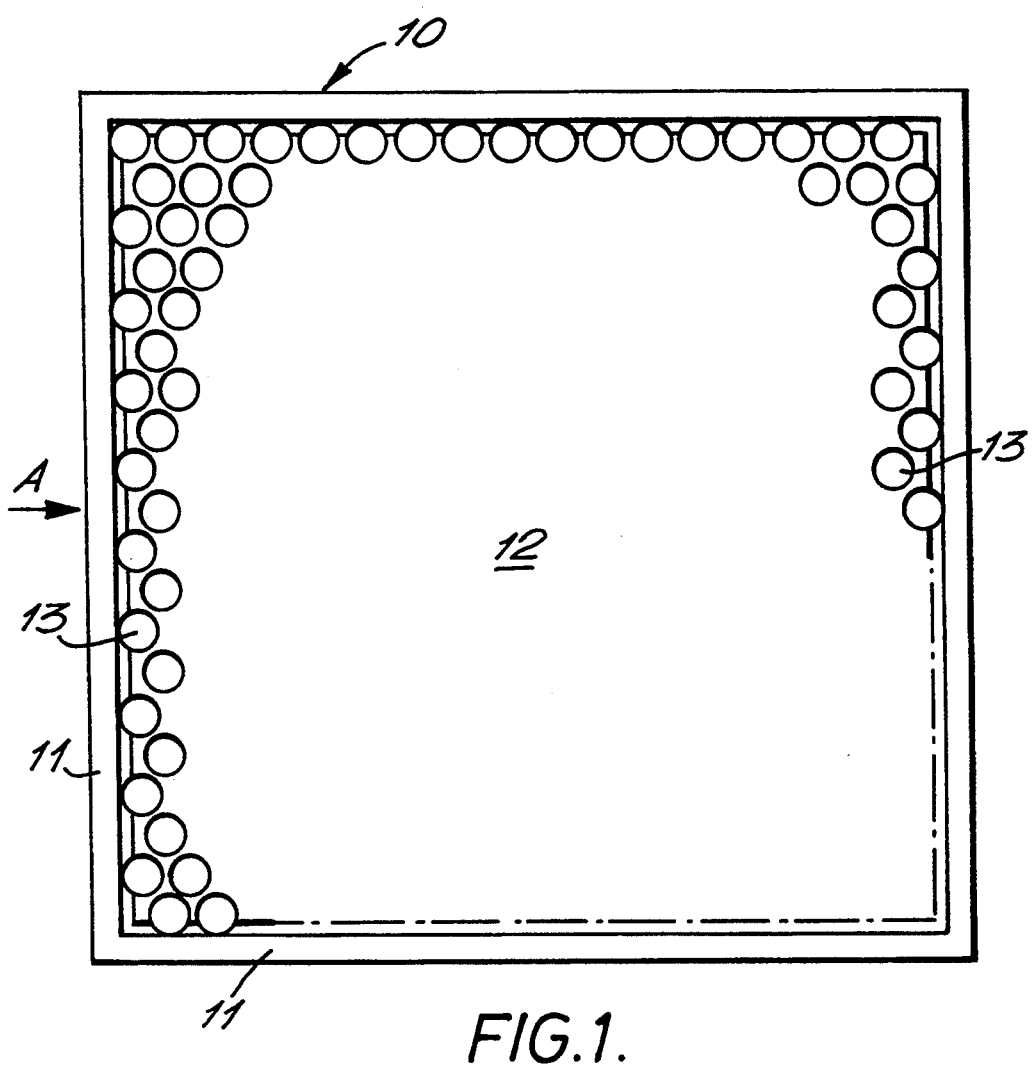
FIG. 1 is a diagrammatic representation in plan view of a ceramic tray which is to be used to carry unfired sparkplug ceramic bodies into a firing kiln.
Figure 2:
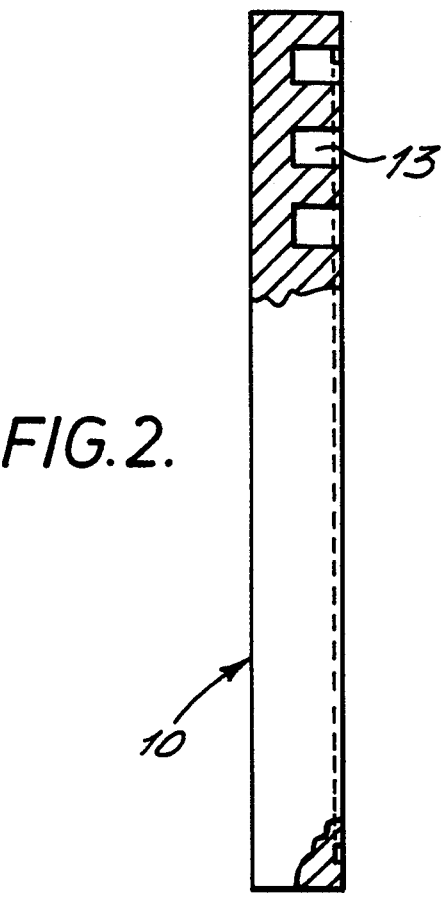
FIG. 2 is a view with parts cut away on arrow A of FIG. 1.
Figure 3:
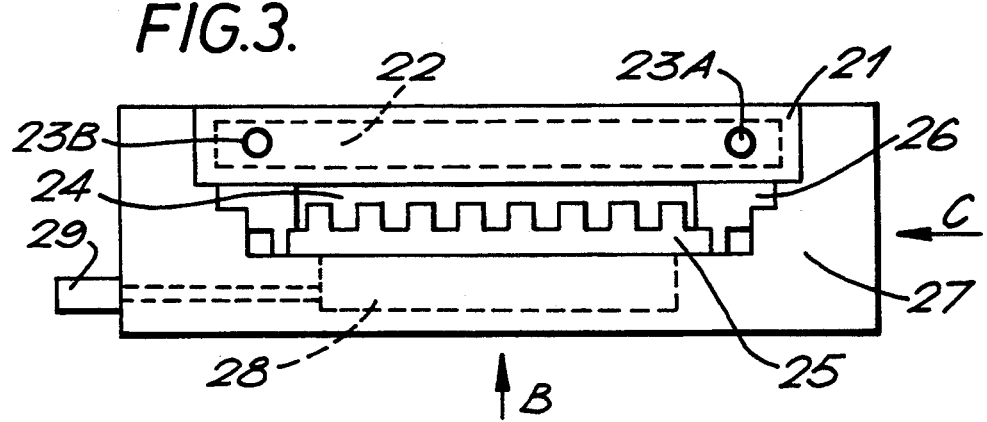
FIG. 3 is a diagrammatic representation in plan view of a mould tooling to make the product shown in FIGS. 1 and 2.
Figure 4:
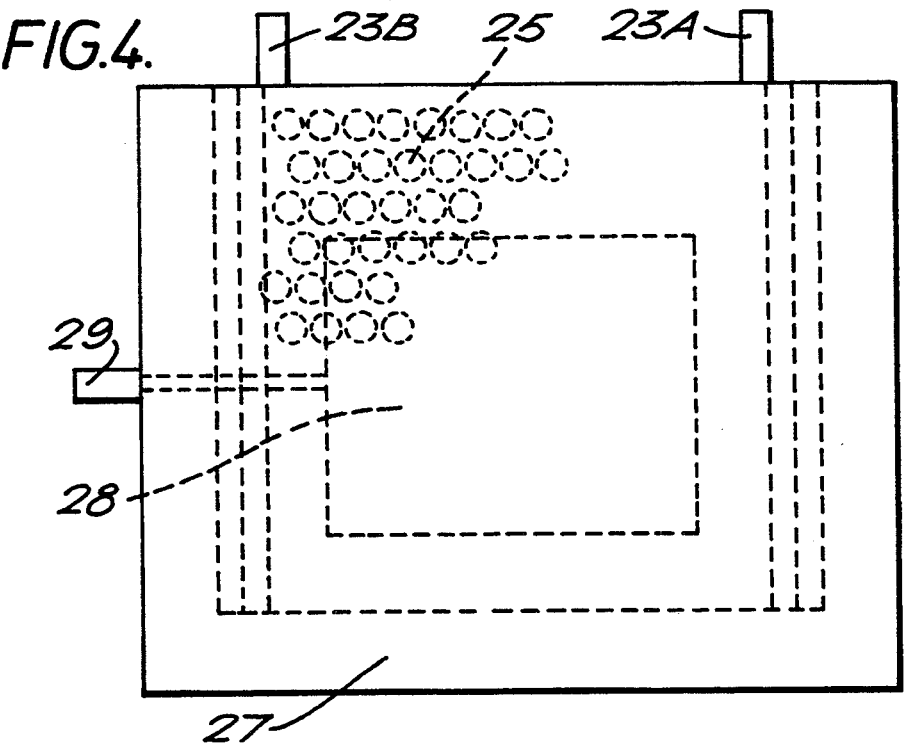
FIG. 4 is a view along arrow B of FIG. 3.
Figure 5:
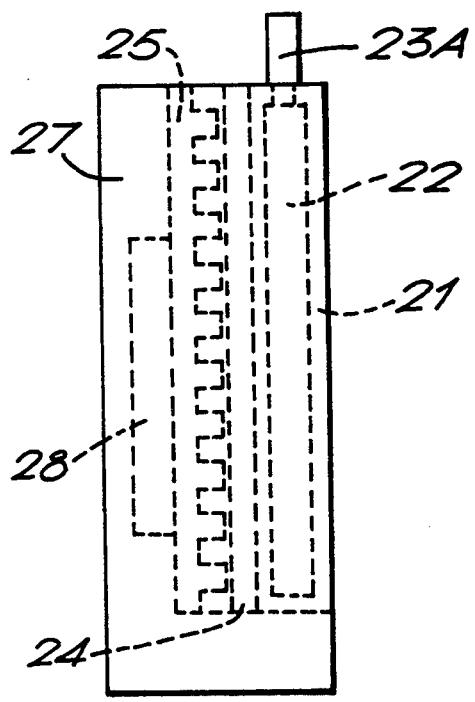
FIG. 5 is a view along arrow C of FIG. 3.

Tray 10 has been manufactured in the mould tooling now described with reference to FIG. 3, 4 and 5.

A mould cavity 24 having the shape and dimensions of the desired tray 10 is defined between a hollow aluminium former 21 and a silicon rubber former 25, the latter providing the multi-cavitied outline required to form cavities 13 in tray 10. The rubber former 25 is secured in the desired spaced relationship from aluminium former 21 by means of frame 26 and the assembly fits within outer tool 27.

Hollow former 21 has a cavity 22 to receive pumped heat transfer fluid via inlet and outlet ports 23A and 23B.

A cavity 28 in tool 27 is located beneath rubber former 25 and is generally co-extensive with that former. Vacuum can be applied to cavity 28 via port 29.

To make ceramic tray 10, a freeze gellable ceramic sol composition containing hollow microspheres is introduced into mould cavity 24. Cooling fluid is passed through cavity 22 in former 21 to freeze-gel the sol composition. Vacuum may then be applied to cavity 28 to aid demoulding.

The frozen monolith so formed in cavity 24 is removed from the mould, thawed and then fired to give the desired end product, i.e. tray 10 which is formed from a ceramic matrix containing the microspheres.

We claim:

1. A method of making a lightweight fired shaped ceramic product in which a freeze-gellable ceramic sol composition is formed containing hollow microspheres, the composition is placed in a mould having a cavity of the desired shape of said product, the mould comprising a tool of high thermal conductivity made by flame-spraying metal onto a replica of the desired shape, and the tool is cooled at a rate sufficient to irreversibly gel the sol composition to form a monolith, the monolith is demoulded, thawed and fired to form a product comprising the microspheres bonded in a ceramic matrix.

2. A method according to claim 1, in which the tool has a thickness of from 0.5 to 4 mm.

3. A method according to claim 1, in which the ceramic sol is a silica sol containing from 5 to 50% by weight of silica.

4. A method according to claim 3, in which the silica sol has a particle size of from 1 to 150 nanometers.

5. A method according to claim 3, in which the sol composition contains a reactive alumina filler to form mullite in situ.

6. A method according to claim 5, in which the alumina filler is of particle size from 1 to 250 nanometers.

7. A method according to claim 5, in which micronised mullite is added to the sol composition to seed further mullite formation.

8. A method according to claim 1, to in which at least two batches of differently size-graded microspheres are added to the sol composition.

9. A method according to claim 8, in which one batch of microspheres is of size below 0.5 mm diameter and another batch of microspheres is of size 0.5 to 1 mm diameter.

10. A method according to claim 1, in which the tool is a hollow aluminium former and the mould cavity is formed between the aluminum former and a rubber former.

11. A method according to claim 10, in which the rubber former is of silicone rubber.

* * * * *